May 30, 1967
T. FLATOW
3,322,230
APPARATUS FOR PRODUCING SEISMIC WAVES
AND RECORDING SEISMIC SIGNALS
Filed April 14, 1965
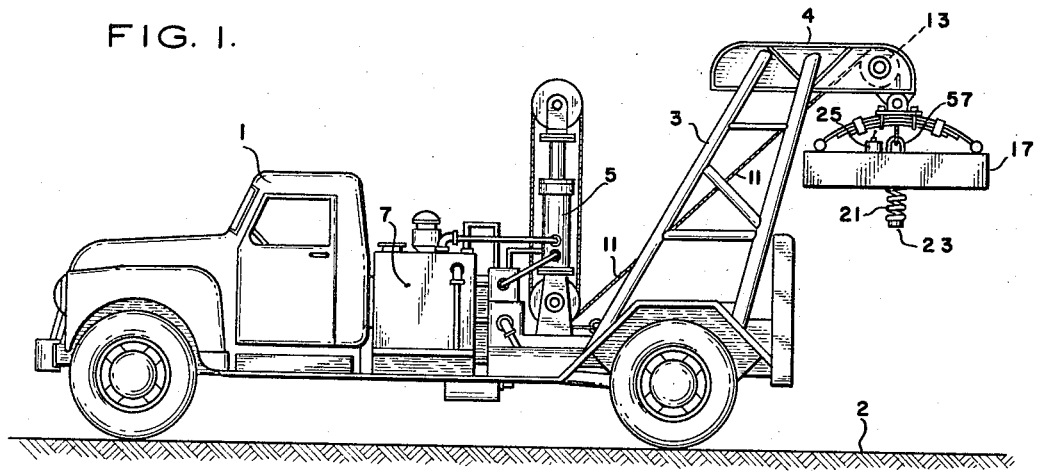
FIG. 1.
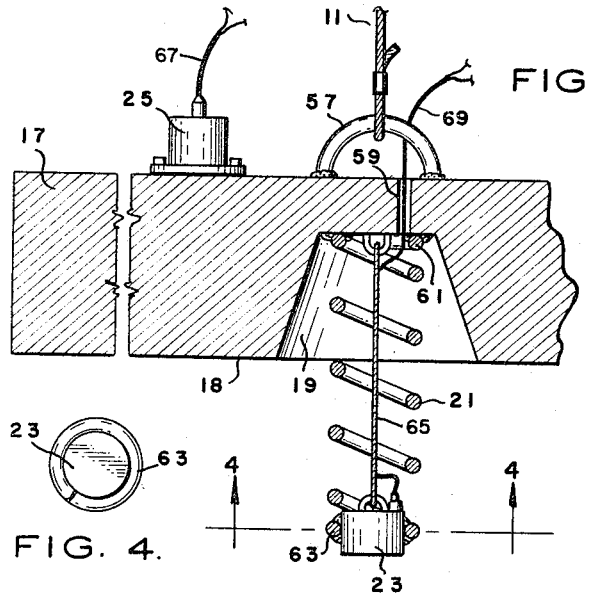
FIG. 3.
FIG. 4.
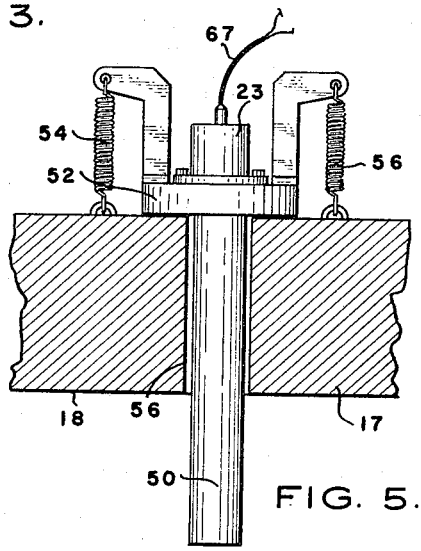
FIG. 5.
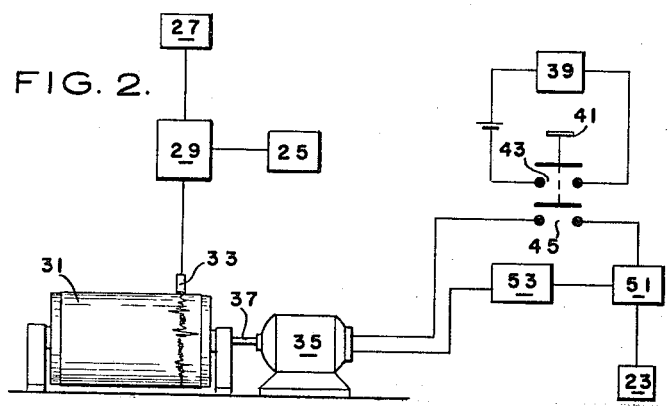
FIG. 2.
INVENTOR.
TOBIAS FLATOW,
BY
John B. Davidson
ATTORNEY.

United States Patent Office 3,322,230
Patented May 30, 1967

3,322,230
APPARATUS FOR PRODUCING SEISMIC WAVES AND RECORDING SEISMIC SIGNALS
Tobias Flatow, Houston, Tex., assignor to Esso Production Research Company
Filed Apr. 14, 1965, Ser. No. 448,027
5 Claims. (Cl. 181—.5)

ABSTRACT OF THE DISCLOSURE

The electric motor of a seismic recorder is energized a predetermined time interval before a seismic wave-producing heavy weight strikes the earth's surface to align "time breaks" on seismogram traces. Apparatus for energizing the motor includes a switch and detecting means depending below the weight a predetermined distance to produce an electrical signal when the detecting means strikes the ground for closing the switch. The detecting means may be a spring-supported geophone or a rod connected to a geophone supported by the weight.

This invention relates generally to seismic surveying, and more particularly to seismic sources comprising heavy weights to be dropped on the earth's surface.

The general method of geophysical exploration using seismic waves is well known. Briefly stated, this method comprises the steps of initiating a seismic impulse at or near the surface of the earth and recording signals generated by geophones as a result of the earth's movement at one or more points more or less spaced from the point of origin of the impulse. The recordation must permit measurement of the time elapsing between the instant of the origination of the impulse and the generation of signals as a result of the subsequent earth movement. The original impulse will set up elastic waves that are transmitted through the earth. Any discontinuity or variation of structure within the earth will reflect and/or refract a portion of the energy in the waves so that a recording of the signal from the receiving points will comprise a number of arriving waves, each derived from the original impulse and each differing from the others in time of arrival, magnitude, and wave shape, or all three.

In the past, the most commonly used technique for generating seismic waves has been to explode dynamite in a shot hole in the earth. In the past few years considerable effort has been exerted to develop a so-called "surface source" for producing seismic waves so as to eliminate the necessity for using dynamite, to eliminate the necessity for drilling shot holes, and generally to reduce the cost of seismic exploration.

One of the most successful surface sources that has been developed is a heavy weight having a substantially plane lower surface which is lifted to a predetermined distance above the earth, usually 7 to 14 feet, to produce seismic waves when it is dropped to the earth. One of the difficulties inherent in the use of the weight dropping, or "thumping," technique has been that of determining the time reference at which the seismic waves are actually produced, so that the traces produced by recording detected seismic waves can be properly aligned for correlation purposes. Various techniques and apparatuses have been developed for this purpose, all of which are quite complex and costly. Generally speaking, some type of "memory" is required for each recorded trace.

In accordance with one aspect of the invention, there is provided detecting means on the weight for detecting a predetermined separation between the planed lower surface of the weight and the earth's surface, and for producing a control signal upon such detection. Electrical circuit means connected to the detecting means and to the electric motor that is customarily used for driving the transport means of a seismic wave recorder is connected in circuit relationship with the motor and electrical terminals adapted to be connected to a power source to start the motor responsive to production of said signal by said detecting means. Thus, when the weight is at a predetermined distance above the earth during the course of being dropped to the earth, the electric motor will be connected to a power source and will reach operating speed just before the weight strikes the ground so that the instant of production of the seismic inpulse will occur when the recording heads or styli of the recording means are at the same position on the time axis of the recording medium.

In accordance with a more specific aspect of the invention, the detecting means comprises a coil spring connected to the weight in a recess that opens into the lower plane surface of the weight, an impact detector connected to the lower end of the coil spring, and a flexible cord connected to the impact detector and the weight so that the detector is always at a predetermined distance from the weight when it is dropped to the earth's surface. The impact detector produces a signal when it strikes the ground. Manifestly, this signal will occur a predetermined time interval before the weight strikes the ground to produce a seismic impulse.

Objects and features of the invention not apparent from the above discussion will become evident upon consideration of the following detailed description of the invention when taken in connection with the accompanying drawings, wherein:

FIG. 1 is a cross-sectional side view of a weight dropping truck and weight incorporating the present invention;

FIG. 2 is an electrical circuit diagram illustrating the manner in which the components of the invention are electrically connected together;

FIG. 3 is an enlarged side view of the weight illustrated in FIG. 1 showing the details of construction of certain of the component parts of the invention;

FIG. 4 is a sectional view taken through section 4—4 of FIG. 3; and

FIG. 5 is a fragmentary sectional view of another embodiment of the invention.

With reference now to FIG. 1, there is shown a weight dropping truck 1 supporting a support structure 3 including a boom 4, for lifting and supporting a heavy weight 17 above tthe earth's surface 2 through a medium of a sheave 13, a cable 11, a cable control mechanism 5, and a hydraulic control mechanism 7. All of the above-recited apparatus are well known to the art and are described in U.S. Patent No. 2,897,907. The apparatus described in this patent for controlling the hydraulic and mechanical means for lifting and releasing the weight includes valves for controlling the direction of flow of pressurized fluid, which valves are controlled by electromagnets identified in FIG. 2 by reference numerals 39 and 47. The electromagnet 47 is operative to effect the raising of the weight 17, and the electromagnet 39 is effective to suddenly release the weight so that it falls in substantially free-fall to the earth's surface. When neither of electromagnets 39, 47 is actuated, the weight 17 is held suspended. An impact detecting device 25 functions to produce an output signal at the instant at which the weight strikes the ground.

As shown most perspicuously in FIG. 3, a recess 19 in the lower portion of the weight opens into the substantially planar lower surface 18 of the weight. A coil spring 21 having closed loops 61 and 63 at the ends thereof is welded or otherwise affixed to the upper surface of the recessed portion of the weight so as to depend through the recess to a point below the planar lower surface 18 of the weight. As illustrated in FIGS. 3 and 4, an impact detecting device 23 is welded or otherwise affixed to the closed lower loop 63. The impact detecting devices 25 and 27 may be geophones adapted to produce an output signal when the device strikes the earth, or impact switches adapted to momentarily open or close so as to produce a pulse in an electrical circuit when stricken by a sharp blow. A flexible cord 65, which may be a two conductor cable of conventional design, is connected between the upper surface of the impact detecting device 23 and the weight so as to limit the distance that the impact detecting device 23 extends below the planar lower surface 18 of the weight. The switch or geophone output terminals of impact detecting device 23 are connected to the conductors of cord 65 by electrical lead 67. The electrical output of the impact detecting device 23 may be transmitted through electrical lead 67, through flexible cord 65, and through electrical lead 69 to suitable apparatus on the truck 1 for actuating apparatus to be described below. The electrical lead 69 may extend through the hole 59 drilled through the weight 17. A geophone 25, or other type of impact detecting device, is for the purpose of detecting the instant at which the weight 17 impacts the ground. Manifestly, a separate lead may be used to transmit the output signal of impact detecting device 23 if such is more convenient.

With reference now to FIG. 2, there is shown a conventional seismic recorder comprising a transport medium 31 driven by an electrical motor 35 through a mechanical connection 37. The transport medium 31 may be of the type adapted to receive either a magnetic tape or a visual recording medium such as photographic film or paper. An appropriate recording head 33 functions to record electrical signals on the recording medium and may be of the type adapted to be adjusted laterally of the time axis of the recording medium. The electrical motor 35 preferably is of the type that comes up to operating speed within about 40 milliseconds after electrical power is supplied thereto.

A suitable electrical power source 53 is connected to the electrical motor 35 through the contact 45 of push-button switch 41 and an electromagnet or other type of gating switch 51 adapted to be closed upon reception of an electrical signal from impact detector 23. When impact detector 23 is of the type wherein an electrical circuit is closed therein when the device is stricken by a sharp blow, the switch contacts of the impact detector themselves may be used to complete the circuit between the electrical source 53 and the normally-open contacts 45 of push-button 41. Push-button 41 also has an additional pair of normally-open contacts 43 which are simultaneously closed with contacts 45 to energize electromagnet 39 to release the weight 17. The electromagnet 47 may be energized by closure of contacts 49 of a separate push-button switch.

The recording head 33 may be energized by the output signals of a geophone 27 through a gating device 29 controlled by impact detecting device 25. When impact detecting device 25 produces an output signal, the gating device 29 is closed so that the output signals of geophone 27 are coupled to recording head 33 for recordation on the recording medium of the seismic recorder.

The operation of the apparatus described above is as follows. Assuming that the recording medium has been adjusted to a predetermined initial position relative to recording head 33, and that the weight has been lifted to the position as shown in FIG. 1 by closure of contacts 49, actuation of push-button switch 41 will close contacts 43 and 45 to simultaneously drop the weight to the earth's surface and to render the electrical circuit of FIG. 2 operative to supply power to motor 35 upon actuation of relay or gate 51. When the impact detecting device 23 strikes the earth, the circuit will be completed and the motor 35 will be energized and begin coming up to operating speed. Spring 21 will be compressed into the recess 19. Several milliseconds before the weight impacts the earth, the motor will be up to operating speed. When the weight 17 strikes the ground, impact detecting device 25 will produce a signal operative to close gate 29 so that seismic signals from geophone 27 are recorded on the recording medium by recording head 33. This process may be repeated time after time, and the instants at which the traces produced by recording head 33 on the recording medium begin will be at the same location on the time axis of the recording medium, provided, of course, that the tape transport mechanism 31 is set at the same initial position prior to closure of push-button switch 41 to release the weight.

When the recording apparatus is at a distance from the weight dropping truck 1, the signals produced by impact detecting devices 23 and 25 may be transmitted to the recording location by radio communication links in the usual manner for seismic exploration using the weight dropping technique. Similarly, the signals for energizing electromagnets 39, 47 may be transmitted between the recording location and the seismic impulse location by means of radio links.

In the embodiment of the invention illustrated in FIG. 5, a bore is provided through the weight 17 having a diameter sufficient to accommodate a rod 50 having an enlarged head member 52 of somewhat greater diameter than the diameter of bore 56. Geophone 23 is affixed to the upper surface of the head member 52. Two or more springs 54 and 56 are connected at one end to the head member 52, and at the other end are secured to the weight 17 by any convenient means a convenient distance away from head member 52 so that head member 52 will be urged downwardly thereby. The rod 50 protrudes a desired distance below lower weight surface 18 so that it will strike the ground a desired time interval before surface 18 strikes the ground. This will cause geophone 23 to produce an output signal as described above.

The invention is not necessarily to be restricted to the specific structural details, arrangement of parts, or circuit connections herein set forth, as various modifications thereof may be effected without departing from the spirit and scope of the invention.

What is claimed is:
1. Apparatus for generating a seismic impulse and recording resulting seismic waves, comprising:
   a seismic wave recorder including a recording medium transport means and an electrical motor for driving said transport means;
   a heavy weight having a substantially plane lower surface;
   means connected to said weight for suspending said weight above the earth's surface and for controllably dropping the weight on the earth's surface;
   a recess in said weight opening into said lower surface;
   spring means connected to said weight in said recess and normally depending from said weight to a predetermined distance below said lower surface;
   impact detecting means connected to the lower end of said spring means for producing an electrical signal upon impact thereof with ground;
   a source of electrical power; and
   circiut means connected to said detecting means, said motor, and said power source for connecting said power source to said motor to start said motor responsive to production of said electrical signal by said detecting means.
2. Apparatus for generating a seismic impulse and recording resulting seismic waves, comprising:
   a seismic wave recorder including a recording medium transport means and an electrical motor for driving said transport means;
   a heavy weight having a substantially plane lower surface;

detecting means engaging said weight for detecting a predetermined separation between said plane lower surface and the earth's surface, and for producing a signal thereupon;

electrical terminals for connection to a source of electrical power; and electrical circuit means connected to said detecting means, said electrical terminals, and said motor for connecting said terminals to said motor to start said motor responsive to production of said signal by said detecting means.

3. The combination of claim 2 wherein the detecting means comprises a bore through said weight, a rod slidably projecting through said bore to a distance below the weight, an enlarged head for said rod engaging said weight to limit downward movement of the rod, and a geophone on said enlarged head.

4. Apparatus for generating a seismic impulse and recording resulting seismic waves, comprising:

a seismic wave recorder including a recording medium transport means and an electrical motor for driving said transport means;

a heavy weight having a substantially plane lower surface;

means connected to said weight for suspending said weight above the earth's surface and for controllably dropping the weight to the earth's surface;

a recess in said weight opening into said lower surface;

coil spring means connected to said weight in said recess and normally depending from said weight to a predetermined distance below said lower surface;

impact detecting means connected to the lower end of said spring means for producing an electrical signal upon impact thereof with ground;

a flexible cord connected to said detecting means and to said weight, and extending through said coil spring means;

a source of electrical power; and circuit means connected to said detecting means, said motor, and said power source for connecting said power source to said motor to start said motor responsive to production of said electrical signal by said detecting means.

5. Apparatus for generating a seismic impulse and recording resulting seismic waves, comprising:

a seismic wave recorder including a recording medium transport means and an electrical motor for driving said transport means;

a heavy weight having a substantially plane lower surface;

means connected to said weight for suspending said weight above the earth's surface and for controllably dropping the weight on the earth's surface;

a recess in said weight opening into said lower surface;

coil spring means connected to said weight in said recess and normally depending from said weight to a predetermined distance below said lower surface;

impact detecting means connected to the lower end of said spring means for producing an electrical signal upon impact thereof with ground;

a flexible cord connected to said detecting means and to said weight, and extending through said coil spring means;

a source of electrical power;

electrically actuatable means for controllably releasing the weight so that it falls to the earth's surface; and electrical circuit means, including switch means for concomitantly actuating said electrical actuable means and completing an electrical circuit including said power source and said motor, to simultaneously release said weight and start said motor.

References Cited
UNITED STATES PATENTS

| | | | |
|---|---|---|---|
| 2,333,558 | 11/1943 | Gay | 102—7.4 |
| 2,662,707 | 12/1953 | Vann | 200—61.42 X |
| 2,849,076 | 8/1958 | Kaufman | 181—.5 |
| 2,851,121 | 9/1958 | McCollum | 181—.5 |
| 3,130,809 | 4/1964 | Flatow | 181—.5 |

BENJAMIN A. BORCHELT, *Primary Examiner.*

G. H. GLANZMAN, *Assistant Examiner.*